United States Patent
Piemonte et al.

(10) Patent No.: US 10,504,288 B2
(45) Date of Patent: Dec. 10, 2019

(54) SYSTEMS AND METHODS FOR SHARED CREATION OF AUGMENTED REALITY

(71) Applicant: Mirage Worlds, Inc., San Francisco, CA (US)

(72) Inventors: Patrick S. Piemonte, San Francisco, CA (US); Ryan P. Staake, Brooklyn, NY (US)

(73) Assignee: Patrick Piemonte & Ryan Staake, San Francisco, CA (US)

( * ) Notice: Subject to any disclaimer, the term of this patent is extended or adjusted under 35 U.S.C. 154(b) by 17 days.

(21) Appl. No.: 15/955,629

(22) Filed: Apr. 17, 2018

(65) Prior Publication Data

US 2019/0318540 A1    Oct. 17, 2019

(51) Int. Cl.
| | |
|---|---|
| *G06T 19/00* | (2011.01) |
| *G06T 19/20* | (2011.01) |
| *H04L 29/08* | (2006.01) |
| *G06F 3/0488* | (2013.01) |
| *G06F 3/0489* | (2013.01) |
| *H04W 4/02* | (2018.01) |

(52) U.S. Cl.
CPC .......... *G06T 19/006* (2013.01); *G06F 3/0488* (2013.01); *G06F 3/0489* (2013.01); *G06T 19/20* (2013.01); *H04L 67/10* (2013.01); *H04W 4/02* (2013.01); *G06T 2219/024* (2013.01)

(58) Field of Classification Search
CPC .................................................. G06T 19/006
See application file for complete search history.

(56) References Cited

U.S. PATENT DOCUMENTS

| | | |
|---|---|---|
| 7,391,424 B2 | 6/2008 | Lonsing |
| 8,810,599 B1 | 8/2014 | Tseng |
| 8,839,121 B2 | 9/2014 | Bertolami et al. |
| 9,754,397 B1 | 9/2017 | Piemonte et al. |
| 2011/0102678 A1 | 5/2011 | House et al. |

(Continued)

FOREIGN PATENT DOCUMENTS

WO    WO-2013023705 A1 *  2/2013    .......... G06T 19/006

OTHER PUBLICATIONS

Peter Rubin, Finally: New Augmented Reality App Mirage Injects the Internet Into Real Life, WIRED, Culture, Aug. 8, 2017 07:00 AM, pp. 1-3. (Year: 2017).*

(Continued)

*Primary Examiner* — Jeffery A Brier
(74) *Attorney, Agent, or Firm* — Ryan Alley IP (57) ABSTRACT

Methods, hardware, and software create augmented reality through several distinct users. Different users may select locations for the augmented reality creation and add augmented objects, elements, and other perceivables to underlying reality through separate communications devices. The users may interface with a GUI for augmenting underlying media, including use of several tools to add particular and separate augmented features. Users may take turns separately editing and adding augmented elements, and once the users are finished collaborating, the resulting augmented reality can be shared with others for re-creation and performance at the selected locations. Users may invite each other to collaborate on augmented reality through the GUI as well, potentially in a contact-based invitation method or any other known communication or chat configuration.

20 Claims, 4 Drawing Sheets

(56) References Cited

U.S. PATENT DOCUMENTS

| | | |
|---|---|---|
| 2012/0026354 A1 | 2/2012 | Hamada |
| 2013/0178257 A1 | 7/2013 | Langseth |
| 2015/0046296 A1 | 2/2015 | Hart |
| 2015/0109481 A1 | 4/2015 | Hayakawa |
| 2015/0138234 A1 | 5/2015 | Yoon et al. |
| 2015/0288944 A1 | 10/2015 | Nistico et al. |
| 2015/0302650 A1 | 10/2015 | Abdelmoati et al. |
| 2016/0004934 A1 | 1/2016 | Ebata et al. |
| 2016/0005233 A1 | 1/2016 | Fraccaroli et al. |
| 2016/0112479 A1 | 4/2016 | Jayaraj et al. |
| 2016/0253745 A1 | 9/2016 | Lee |
| 2016/0284131 A1 | 9/2016 | Koga |
| 2017/0046878 A1 | 2/2017 | Dobslaw |
| 2017/0069143 A1 | 3/2017 | Salter et al. |
| 2017/0084082 A1 | 3/2017 | McTaggart et al. |
| 2017/0094262 A1 | 3/2017 | Peterson et al. |
| 2017/0124713 A1 | 5/2017 | Jurgenson et al. |
| 2018/0165885 A1* | 6/2018 | Rodriguez, II ......... G06F 3/011 |

OTHER PUBLICATIONS

Kirner, C et al., Interaction, Collaboration and Authoring in Augmented Reality Environments, Proceedings of XI Symposium on Virtual and Augmented Reality, Porto Alegre, SBC, 2009, v. 11, pp. 210-220. (Year: 2009).*

Lemley, "Law, Virtual Reality, and Augmented Reality," Mar. 15, 2017 (available at ssrn.com/abstract=2933867), pp. 1-64.

Held, "Learning to Track at 100 FPS with Deep Regression Networks," 2016, Stanford University (available at arxiv.org/abs/1604.01802), pp. 1-17.

Adario Strange, "Hunt for historical figures with this augmented reality app from IBM and the NY Times," Jan. 5, 2017, Mashable (available at mashable.com/2017/01/05/augmented-reality-outthink-hidden-app/#x9YuefXK5aq7), pp. 1 of 13 to 4 of 13.

T Brand Studio AR, Feb. 1, 2017, iTunes (available at itunes.apple.com/us/app/t-brand-studio-ar-augmented/d1184006872), pp. 1 of 4 to 3 of 4.

* cited by examiner

FIG. 3

SYSTEMS AND METHODS FOR SHARED CREATION OF AUGMENTED REALITY

BACKGROUND

Augmented reality applications may use a simple overlay of graphical/added subject matter on live or recorded video or still images. In these simple systems, a user or application may position a static graphic, text, or other visual element superimposed on the underlying video or image. Augmented reality applications may also combine augmented reality subject matter with underlying visual data, or use the underlying visual data to position the augmented reality subject matter. For example, a human face may be recognized in a video feed or image still, and the augmented reality application may apply coloration, designs, distortions, etc. to the face, so as to further the augmented reality effect that the face actually has such characteristics.

Augmented reality subject matter is typically provided by the application receiving the visual data. For example, an application may offer a set of stickers, labels, drawn text, cartoons, etc. that can be applied to live or captured visual information and then saved together with the visual data as an augmented reality visual. Or, for example, a set of facial overlays, game images and objectives, graphical heads-up displays or GUIs, etc. can be offered by augmented reality applications for overlay/intermixing with visual data to created augmented reality visuals for users.

The created augmented reality is typically static when saved. For example, if a user creates a scene from a real-world photograph with added sticker, or real-world audio-visual stream with added animated object, the resulting augmented reality is saved upon creation for replay later without modification. The augmented reality may be shared with other users in this non-modifiable, static state for their reproduction.

SUMMARY

Example embodiments and methods include creating augmented reality among several distinct users in a computerized system, including on mobile devices and wearables. A first user selects a location for augmented reality creation and optionally adds augmented aspects to the media through their device, and a second or further users add augmented aspects to the media through their separate devices. The various users and devices can be completely unrelated, separately controlled, and even anonymous to each other. Once the users are finished collaborating in creating the augmented reality, it can be shared with yet further users who can reproduce the augmented reality aspects at the location. Users may create augmented reality through custom build graphical user interfaces (GUIs) on their various devices. The augmented reality under construction may update in a turn-based fashion between users handing off creation control, or simultaneously among multiple users.

In some example embodiments and methods, augmented reality may be recreated only at positions similar to or in proximity to its original creation. For example, creating user(s) may set a geographic limitation on where a particular created augmented reality may be recreated by third parties. Once performed, the augmented reality may be saved by the recreating users, potentially in connection with a particular creating user, and/or send to a projector or printer for remote re-creation.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the example embodiments herein.

DETAILED DESCRIPTION

Because this is a patent document, general broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

It will be understood that, although the terms first, second, etc. may be used herein to describe various elements, these elements should not be limited to any order by these terms. These terms are used only to distinguish one element from another; where there are "second" or higher ordinals, there merely must be that many number of elements, without necessarily any difference or other relationship. For example, a first element could be termed a second element, and, similarly, a second element could be termed a first element, without departing from the scope of example embodiments or methods. As used herein, the term "and/or" includes all combinations of one or more of the associated listed items. The use of "etc." is defined as "et cetera" and indicates the inclusion of all other elements belonging to the same group of the preceding items, in any "and/or" combination(s).

It will be understood that when an element is referred to as being "connected," "coupled," "mated," "attached," "fixed," etc. to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two electronic devices, including intermediary devices, networks, etc., connected wirelessly or not.

As used herein, the singular forms "a," "an," and "the" are intended to include both the singular and plural forms, unless the language explicitly indicates otherwise. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

The structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from single operations described below. It should be presumed that any embodiment or method having features and functionality described below, in any workable combination, falls within the scope of example embodiments.

The inventors have recognized that augmented reality offers a useful way of communicating additional information about media typically encountered on communication devices. However, existing augmented reality is available only in connection with very specific objects, such as QR codes, filters matching a single type of object such as a face, or predefined files from a single source, all of which define how augmented reality elements should be displayed, often without any additional user input or customization. Thus, the inventors have newly recognized a problem where augmented reality does not uniquely describe or associate with other commonly-encountered media in accordance with user desires, where it is more useful. Similarly, the inventors have recognized that it is difficult for multiple individuals to create augmented reality together in a same, non-pre-set context. That is, users are unable to collaborate on creating augmented reality in arbitrary media, especially in nonstandard media encountered on only a single communications device. The inventors have developed example embodiments and methods described below to address these and other problems recognized by the Inventors with unique solutions enabled by example embodiments.

The present invention is devices, software as stored or executed on tangible computer-readable media, and methods for creating and sharing augmented reality among multiple users. In contrast to the present invention, the few example embodiments and example methods discussed below illustrate just a subset of the variety of different configurations that can be used as and/or in connection with the present invention.

Co-owned U.S. application Ser. No. 15/482,670, filed Apr. 7, 2017, and U.S. Ser. No. 15/696,157, filed Sep. 5, 2017, by Piemonte and Staake ("'157 application"), are incorporated herein by reference in their entireties. Co-owned U.S. Pat. No. 9,754,397 issued Sep. 5, 2017 to Piemonte and Staake is incorporated by reference herein in its entirety. As used herein, "communications device(s)"—including user communications devices 20a, b, c of FIG. 1—is defined as processor-based electronic device(s) configured to receive, transmit, create, and/or perform augmented reality content, including devices 20 from incorporated application '157. Information exchange, and any communicative connect, between communications devices must include non-human communications, such as digital information transfer between computers. As used herein, "augmented reality" is defined as subject matter including a mixture of both real-life audio, visual, tactile, and/or other sensory media and augmented audio, visual, tactile, and/or other sensory subject matter added by the communications device. As is apparent from this meaning, in augmented reality the added subject matter may be added by a mobile phone, wearable, projector, or any other communications device and perceived in temporal and/or spatial fashion as if it actually existed with the real-life subject matter on a communications device. For example, augmented reality could include a real-time, real-life audio-video feed captured by a camera and microphone on a communications device that is perceived in combination with an added graphical element that moves as if a full, three-dimensional part of the underlying real-life subject matter from the feed.

Figure 1:
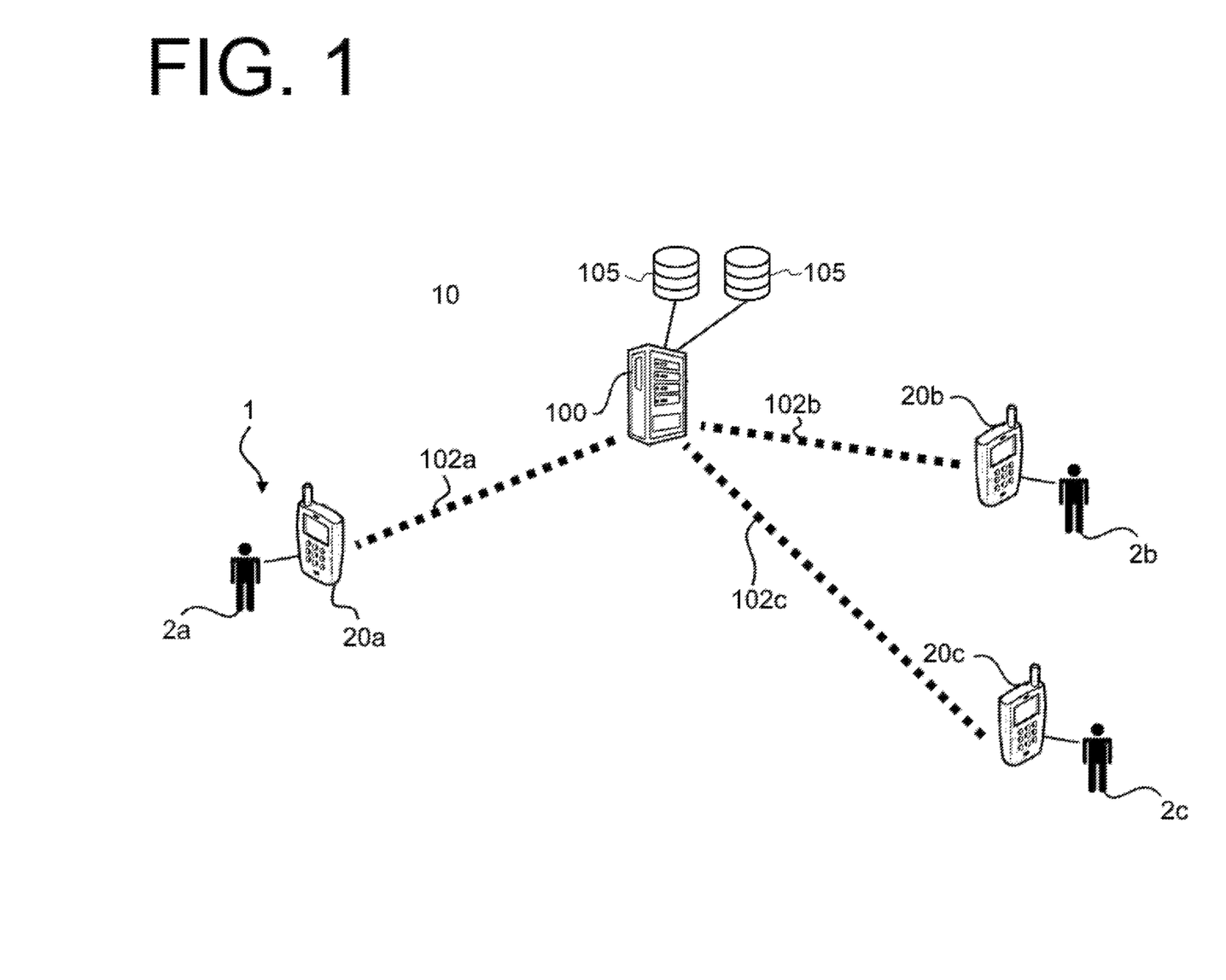
FIG. 1 is an illustration of an example embodiment network configured to share and perform augmented reality.
Figure 2:
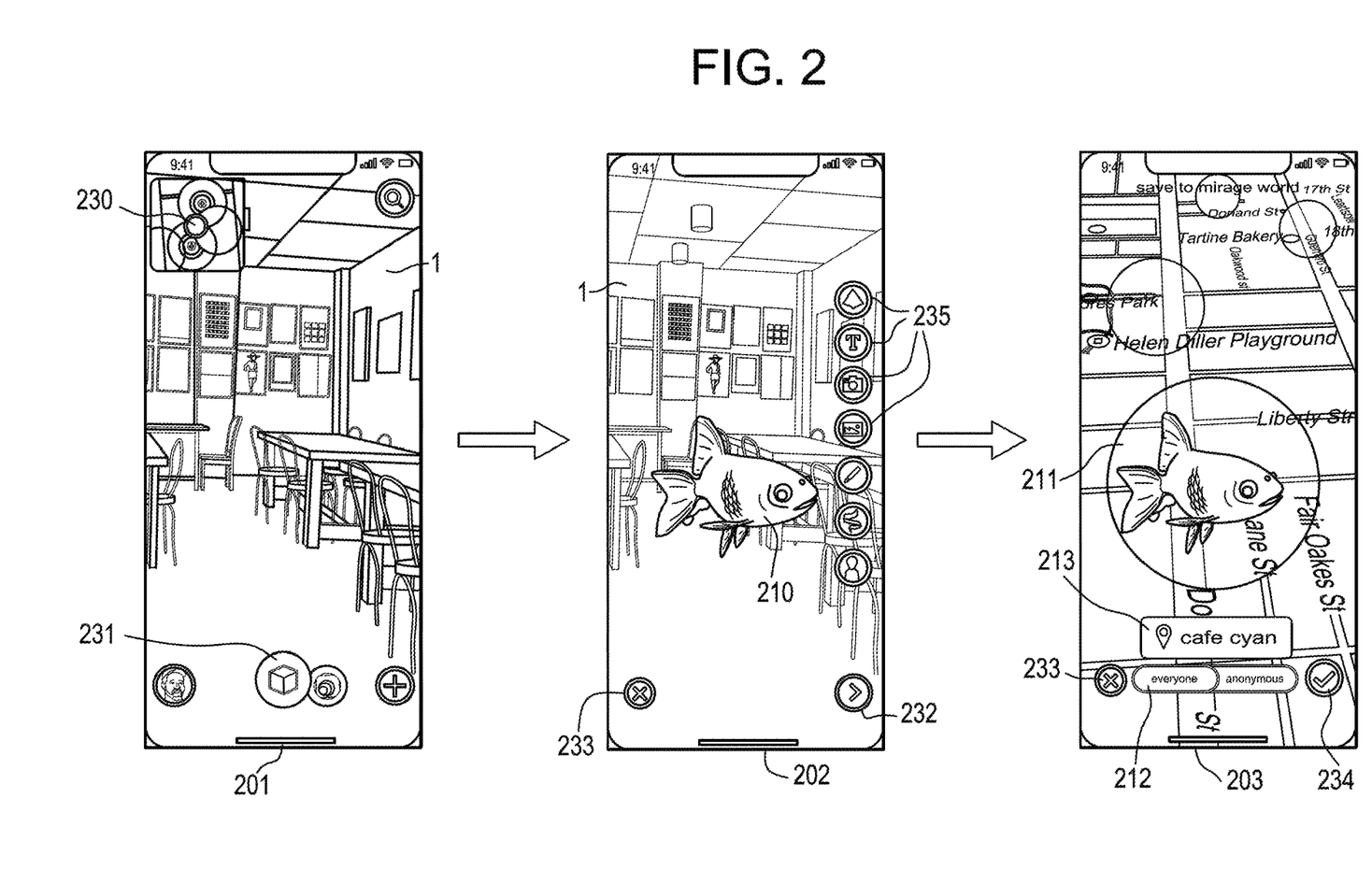
FIG. 2 is an illustration of a screen flow among example embodiment GUIs for creating augmented reality.
Figure 3:
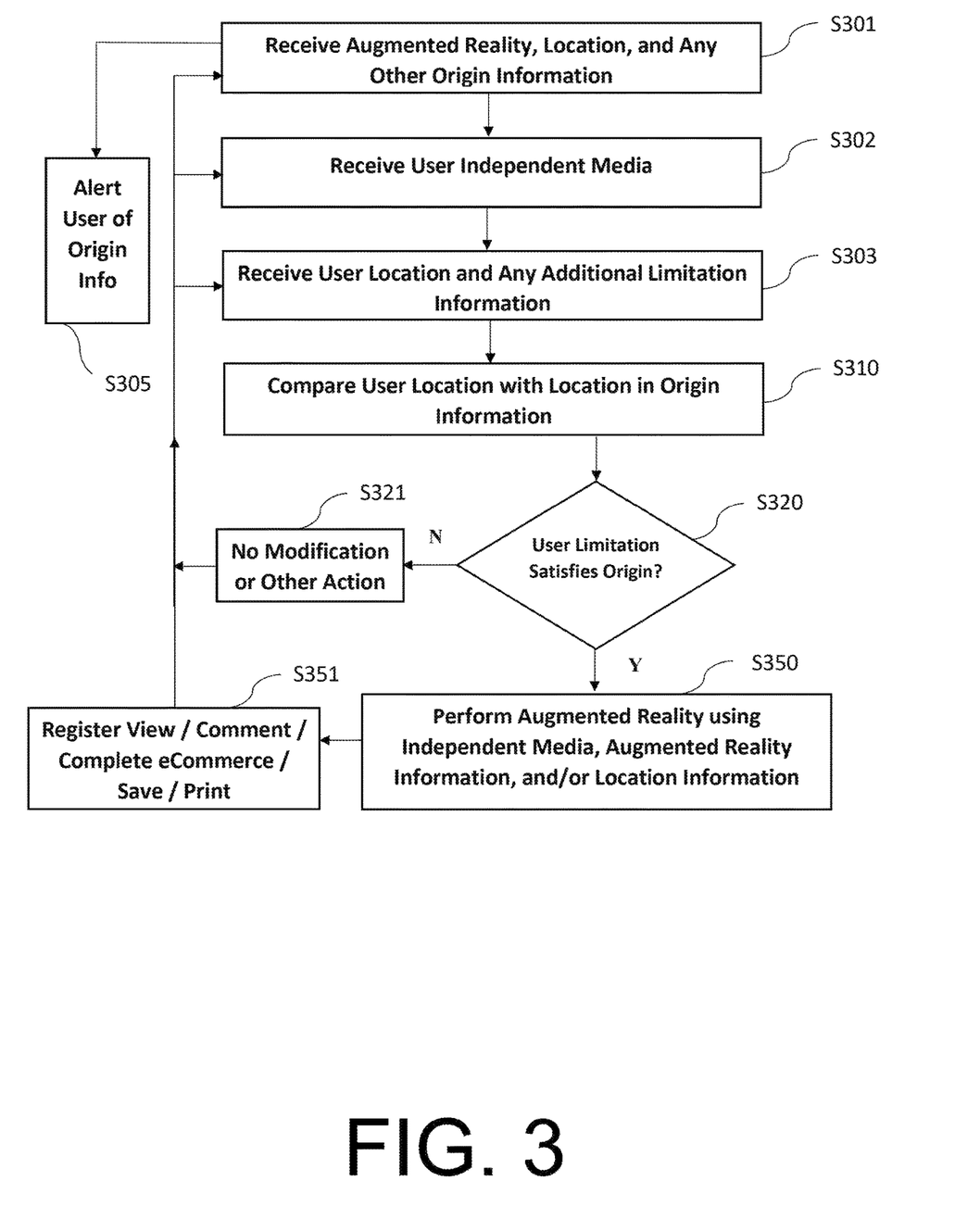
FIG. 3 is a flow chart of an example method of creating and sharing augmented reality.

FIG. 2 illustrates screen flows among several example embodiment graphical user interfaces 201, 202, and 203 that can be presented on a communications device in connection with the example network of FIG. 1 and example method of FIG. 3. GUIs 201, 202, and 203 include several input and interaction fields that permit creation of augmented reality in context with captured real-word media 1. Example embodiment GUIs 201, 202, and 203 and the example method of FIG. 3 may particularly enable creation of augmented reality using no anchor information per se and instead relying on location information and other origin information to faithfully create, share, and re-create augmented reality among users at a same location, at same or different times.

As seen in FIG. 2, GUI 201 may display several input fields in combination with real-life media 1 in real time through a lens front, touchscreen, projection display, etc. of a communications device like a wearable or smartphone, for example. Capture indicator 231 may be overlaid on real-life media 1, which may be an audio-visual feed captured and displayed in real time in the example of FIG. 2. Instead of anchor information as in the method of the incorporated '157 application, augmented reality created from real-life media 1 through GUI 201 may be triggered using only origin information, including location information. As seen in S301 of FIG. 3, the capture of real-life media 1 and its augmentation at a particular location in GUI 201 may provide the augmented reality and location in S301.

In example embodiment GUI 201, location indicator 230 may show an area where created augmented reality is available for reproduction on other devices or in separate instances in media 1. The location may be a geofenced area or a range position associated with a specific building, business, park, interior, point-of-interest, GPS coordinates, etc., as determined through GPS, WiFi identifier, cellular network information, user input, check-in information from trusted applications, location sideloading from nearby devices, and/or other location-determining. Location may further be a relatively precise position including orientation and elevation, such that location information, used as origin information in S301 and/or S303 (FIG. 3), is relatively strict and will trigger augmented reality in S310-S350 only at relatively exact location and orientation for higher-fidelity augmented reality reproduction without anchor information. In this way, a user interacting with GUI 201 may perceive underlying real-life media 1 in which augmented reality information will be added, and further the user may identify and/or set the location boundaries in location indicator 230 where the resulting augmented reality may be reproduced.

By activating capture field 231 in GUI 201, such as through a touch or voice command, a user may be transferred to an augmented reality build GUI 202. Upon transfer, location indicator 230 and other information may be hidden, and GUI 202 may present various tools 235, such as a text tool, object or icon tool, capture and/or overlay picture tool, drawing tool etc. for selection by a user. Other platform- and service-provided tools and even APIs may be provided in GUI 202. For example, a tool may permit overlay of a tweet, direct message, sms content, Instagram photo, Giphy animation, image search result, etc. on underlying real-world media 1 along with further stylization to create augmented reality.

In the example of FIG. 2, a user has selected an object tool and super-imposed a 3D animated goldfish 210 in the underlying media 1. Corresponding to the example method of FIG. 3, the underlying real-word media 1 augmented with a hovering, animated goldfish 210 may be the augmented reality received in S301. Augmented reality object 210 alone, or in combination with underlying media 1, may be transmitted in S301 maybe the augmented reality. This may then be performed at a separate instance as augmented reality in S350 as a real object in the media that reorients, moves, and reacts as underlying media 1 changes, or the displaying communications device moves, due to user movement or reorientation.

Example embodiment augmented reality build GUI 202 may permit zooming, rotation, translation, or other movement of captured real-world media 1 through tactile input, including long-touching, tapping, pinching, spinning, dragging, etc. of finger(s) or stylus(es) across a touchscreen presenting the same, potentially in combination with the above-discussed tools. Similarly, added augmented elements 210 may be moved, anchored, repositioned, animated, reshaped, deleted, recolored, etc. through such tactile input as well as through tool stylization by the creating user. For example, a user may tong-touch a particular image or graphic to fix it at a locked position in the underlying captured real-world media 1, and the image or graphic may track the underlying reality in size, orientation, position, etc. so as to appear as a part of the underlying reality.

Of course, other input, such as through a keyboard, mouse, programming, etc. can manipulate objects on GUI 202. In addition to visual confirmation and display, example embodiment communications device 20 may permit tactile and auditory feedback and input in creation of augmented reality through example embodiment GUI 202, such as through microphones, transducers, etc. that capture such tactile, auditory, or any other sensory feedback and add the same to underlying real-world media in the GUI.

Upon acceptance of the created augmented reality, the user may activate an accept button 232, such as through touch or other input, and be transferred to example embodiment GUI 203. The augmented reality as built may then be held static without further modification in GUI 203, where it may be represented by a simplification or icon of augmented reality elements in the created augmented reality. Example embodiment GUIs 202 and 203 may include a cancel button 233 or other option that steps back to previous method steps or GUIs or cancels all work entirely.

As shown in FIG. 2, example embodiment launch GUI 203 allows the created augmented reality to be saved for third-party reproduction. GUI 203 may allow input of additional location and other origin information, as received in S301 and used in S310-350 of FIG. 3. For example, the user may set a location radius 211 or geofenced area where the augmented reality is eligible for re-performance. The user may also set a point-of-interest, pin drop, or geotag 213 for a specific location or area where the created augmented reality is eligible for re-performance. As seen in GUI 203, additional circles or zones (shown as higher, empty round areas) may be presented to the user to show other locations with available augmented reality already saved to the world, and which other users may see and reproduce, so that the creating user may better judge the popularity and crowdedness of augmented reality at particular locations and areas.

Similarly, in example embodiment launch GUI 203, the user may toggle a sharing filter or privacy setting 212 to change who may be alerted of the augmented reality and/or reproduce the same. Privacy setting 212 may be toggled or input with user ID, social relationship, or groups of other users, for example, who can find and/or reproduce the augmented reality. This input may be additional origin information received in S301 and used in S310-350 of FIG. 3. In the example of FIG. 2, the user has not further limited with any origin information but instead opened the augmented reality to "everyone"; however, it is understood that particular users, contacts, groups, user types, etc. could be used as origin information received through setting 212. The user may also set their user ID or other registration settings in association with the augmented reality. In the example of FIG. 2, the user has set the augmented reality to "anonymous" so that the user is not publicly associated with the augmented reality.

Once all settings are accepted through accept option 234 or another completion input, the augmented reality information, such as additional object 210, location information from 230/213/211, and any additional origin information, such as limits from settings 212, are saved or transmitted in a facilitating memory and processor in S301 (FIG. 3). This facilitating memory and processor could be, for example in FIG. 1, an application host 100, the creating users' communications device 20, a reproducing users' communication device 20, and/or any other connected memory and processor specifically configured to execute example methods and process augmented reality. The created augmented reality— in this example a three-dimensional goldfish that will be seemingly positioned with real-world underlying media through the reproducing user's communication device— may be ready for consumption at the associated location by third parties and/or at separate instances.

The remainder of the example method of FIG. 3 may be executed similarly to example methods in the incorporated '157 application. For example, a third-party, or second, user with a separate communications device may execute an app configuring a communications device to receive independent media in S302 and location and/or other limitation information in S303 for that user. In addition to using only anchor information and matching among independent media and anchor information, the performance of the augmented reality may be conditioned on location and any other origin information match, potentially without anchor information or media matching. For example, in S303, the second user may use only location and other limitation information like user ID, time of day, subscription status, group membership, etc. in determining whether the augmented reality is performed in S320, S321, and S350. Using only location information, the augmented reality may not be performed based on anchor information for exact reproduction. In addition to the trigger in S320, the performance of augmented reality in S350 may also be based on the second users' location, including position, orientation, elevation, speed, etc. as determined by a communications device. In this way, location may be used to improve and make more realistic augmented reality elements at that location for the second user.

In the example of FIG. 2, any user who enters the location radius 211 or geotag 213 of "café cyan" may satisfy the comparison in S320 and perform the augmented reality. That is, users within the location may be able to perform the augmented reality as a visible 3D goldfish 210 interposed with underlying real-life media captured on their communications device at the location, with goldfish 210 moving based on (re-)location and/or (re-)orientation of the communication device. Of course, the location information received in S301 may be relatively precise, such as within a few inches or GPS resolution, and at a particular device orientation as determined by an accelerometer and/or magnetometer, resulting in the goldfish being performable only at a specific location and orientation in this example of S350.

Although in the example of FIG. 2 location is used to trigger performance of the augmented reality, it is understood that image and/or other media recognition may still be used to position and otherwise perform augmented reality in S350. For example, the image recognition methods of the incorporated '157 application may be used to fix a 3D goldfish 210 in a same, proportional position based on underlying media 1. Similarly, as discussed above, device GPS or other determined location, orientation as determined from gyroscope, speed as determined from accelerometer, and/or any other positional data of the device with respect to underlying media 1 can be used to more realistically position or otherwise perform augmented elements in underlying media 1, such as three-dimensional goldfish 210. In this way, any data, sensor information, signals, etc., including location, orientation, magnetic field, local network, nearby device(s), underlying media, etc., including data from a cellular, WiFi, Bluetooth, GPS, and/or other antenna, camera, gyroscope, magnetometer, heat sensor, and/or accelerometer, input device, tactile sensor, etc. in the communications device device configured with example methods can be used to more realistically insert augmented elements into underlying media performed on the same. This information can be received as augmented reality information in S301 and/or used as augmented reality information in S350 to perform the augmented reality.

In this way, a user may reproduce augmented reality created by another user and/or at another time at a same or similar location and in accordance with any other origin limits set by the creating user. While the augmented reality performed by the user may vary somewhat from the augmented reality created by the other user without strict anchor information, use of location alone may permit relatively similar performance of the augmented reality, especially an augmented reality that is relevant to, or in context with, a particular location, such as a swimming, 3D goldfish 210 appearing anywhere as a real part of a café serving fish or a park having a koi pond.

In S351, in addition to registering, commenting, and ecommerce options, a user may save the augmented reality as it is being performed as well as aspects of the augmented reality, including added element 210. These pieces of information may be saved in connection with a particular originating user, location, or any other metric selected by the performing user. The saved augmented reality or aspects thereof may be reproduced in whole or in part, or used to build future augmented realities in a new S310. Similarly, in S351, the augmented reality or portion thereof may be sent to a transactional resource like a remote display or 3D printer, where the augmented reality or portion thereof may be reproduced or printed out as a three-dimensional object.

FIG. 1 is an illustration of an example embodiment network 10 useable to create and share augmented reality content among and to multiple users. The incorporated '157 application shows a related network of which example embodiment network 10 may be a subcomponent or configuration of. As shown in FIG. 1, network 10 provides communicative connection among several different users 2.

Users 2 may be operators of communications devices 20 operating in network 10. A first user 2a with communications device 20a may be at a first position or environment containing real-world media 1 with media to be augmented. Second user 2b and third user 2c may be elsewhere at that moment or co-located with communications devices 20b and 20c, respectively. Through interface with application host 100 and databases 105, communications devices 20a, 20b, and 20c may be capable of jointly contributing to, creating, and/or performing augmented reality in underlying real-world media 1, even though not necessarily all present in real-world media 1.

In terms of data management, communications device 20a may create and/or edit augmented reality in underlying real-world media 1 via an assigned unique socket 102a by application host 100. Communications devices 20b and 20c may interface with that augmented reality and contribute to editing the same through sockets 102b and 102c assigned to the same augmented reality as socket 102a by application host 100. Application host 100 may control access to socket 102a for collaboration on device 20a. For example, user 2c on device 20c may not be given access to the shared socket, while user 2b on device 20b is given access. Such access may be determined using standard messaging and social connection methods, including access code, invitation, location, user ID, online status, etc. to connect any two users to jointly create augmented reality in an example embodiment network 10.

The augmented reality may be stored at any location, even during active editing, where it may be resident in transient memory before being stored in permanent memory. For example, all devices 20a, 20b, and 20c may perform and/or edit augmented reality resident on host 100; alternatively, the augmented reality may be resident on device 20a and edited there, with later transfer for performance on devices 20b and 20c. Example embodiment network 10 may otherwise be configured the same as in the incorporated '157 application. For example, devices 20b and 20a may connect to application host 100 through any number of intermediary networks. Similarly, devices 20b and 20a may connect without application host 100 by forming their own shared sockets 102b and 102a for directly connecting and joint editing of augmented reality. In the instance of a direct connection, application host 100 may simply provide downloadable software and configure devices 20a and 20b to enable them to make such a connection independently.

Figure 4:
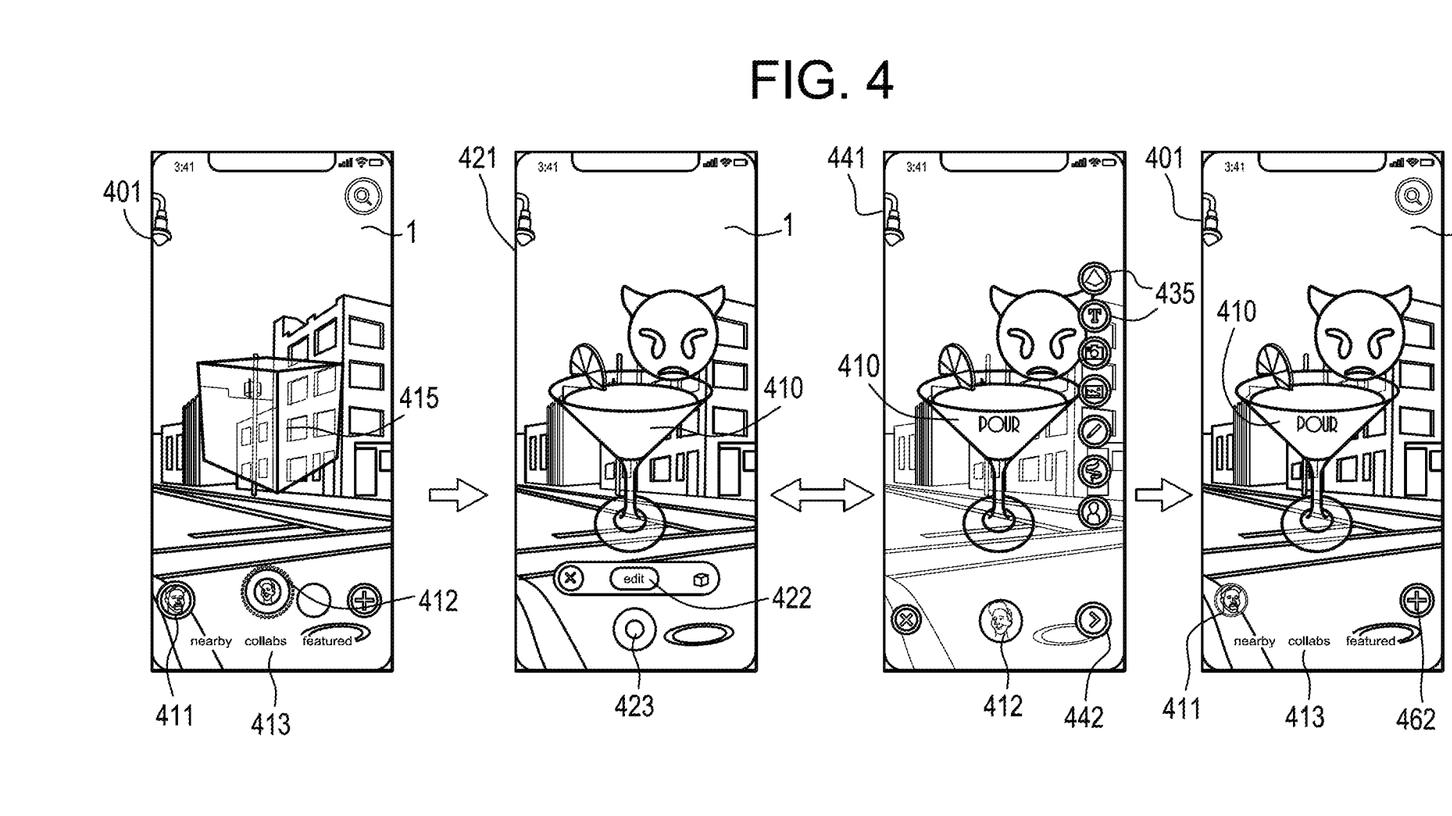
FIG. 4 is an illustration of a screen flow among example embodiment GUIs for creating augmented reality.

FIG. 4 is an illustration of a screenflow between GUIs on potentially multiple communications devices useable to collaboratively create augmented reality. The collaboration in FIG. 4 may create any of the augmented reality, location, and origin information in S301 (FIG. 3), but from multiple users on multiple communications devices. For example, the creation in FIG. 4 may use example embodiment network 10 having distinct communications devices 20a, 20b, and 20c with various GUIs therein.

As shown in FIG. 4, capture GUI 401 may present a capture and build screen for a first user on a first communication device, including actual media 1 captured and displayed in real time, such as on a touchscreen, on a projected screen, through a lens, etc. Capture GUI 401 may also present capture and build options on pre-created media, such as on a stored video saved on the communications device for later augmenting, potentially in association with the location of the captured media for use as location information.

Because the addition and modification of augmented reality information may be shared with users not experiencing, having the location of, or otherwise having access to underlying media 1 at a different location, definition zone 415 may be toggled on the screen and placed at a fixed position for adding augmented reality information. A user may size, locate, or otherwise place zone 415 within underlying media 1, at a location as determined by GPS, user input, WiFi location, etc., through dragging, pinching, keyboard typing, stylus input, etc. Zone 415 may define where augmented reality created by any user may ultimately appear in underlying media 1, thus setting mutual boundaries for augmented reality creation among several users. Augmented reality information added by any user may be sized within zone 415 and positioned accordingly within media 1 and/or at the location of zone 415. In this way, zone 415 may replace underlying anchor information and/or independent media for users not having access to the same in example methods to provide a specific location where augmented reality aspects are added to underlying media.

Capture GUI 401 may include a mode bar 413, showing a collaboration mode selected in FIG. 4. The collaboration mode may prompt the display and positioning of definition zone 415, or collaboration may be selected after zone 415 is defined and positioned. Upon selection of collaboration from mode bar 413, a user selector 412 may be displayed, allowing the user to select another user for collaboration based on any of several desired parameters, including online status, contact information, proximity, app status (installed, active, version, etc.), follower/friend status etc. For example, the account display 411 may be associated with the first user, and user selector 412 may open a screen of available contacts for that first user when activated. Alternatively, user selector 412 may display a list of public nearby users for collaboration with the first user in account display 411. The other user may also be selected randomly. User selector 412 may display the selected second user or may display the selected second user status or an invitation status after the first user has made the selection of that second user. The status may update and/or user selector 412 may change when the second user accepts the collaboration invitation or interacts with shared media or in example methods.

In the context of FIG. 1, once the second user has accepted or otherwise been connected, a unique second user socket 102b with host 100 for collaborating may be created and associated or otherwise connected with the first user socket 102a. The two users, 2a and 2b, may then collaborate on augmented reality through their communications devices. While only two users are described in this example, it is understood that third user 2c, and any number of collaborating users, may be invited and/or connected in this fashion. Although a central application-host-mediated is useable with sockets 102a and 102b connected through application host 100, it is understood that these sockets may directly connect between communications devices and merely be mediated or allowed by host 100 providing necessary configuration at that time or at another time with application install or configuration.

The second user's communication device may display a second user edit GUI 421 with an augmented reality information edit mode for that user. For example, GUI 421 may include tools similar to those seen in example embodiment GUI 202 of FIG. 2 or tools 435 in GUI 441 (described below). Example embodiment GUI 421 may also display the first users' real world media 1, or a black background, or zone 415 on the second user's communications device. In the example GUI 421, the first user has already placed two 3-D augmented reality objects 410 with the tools (not shown) through GUI 401, and these are shown on the second user edit GUI 421. The second user may also record or save the created scene on GUI 421 by activating save button 423.

Within edit bar 422, the second user may select an edit mode, discard action, and/or place action as seen in edit GUI 421 in FIG. 4. When the second user is done creating augmented reality or editing augmented reality object 410, for example, the second user may select the place option of edit bar 422, and the created augmented reality may be saved and shared with the first user on receiving GUI 401. The first user may also watch the creation or modification of augmented reality from the second user in real time on receiving GUI 401, such that GUI 401 and GUI 421/441 on different devices and/or operated by different users may be nearly identical or only slightly out of sync at any moment in time.

Upon selecting the edit option though edit bar 422 on GUI 421, the second user may be taken to second user sub-edit GUI 441 with tools 435. For example, tools 435 may include object, text, picture, image, freeform, ribbon, and unique user tools for editing and/or adding to the augmented reality objects shared from the first user. For example, in second user sub-edit GUI 441, the second user has selected a text tool through tools 435 and input additional wording on the object 410, such as by tapping and/or long-touching the object with the selected text tool and typing "pour" in this example through a keyboard function or external input. The edited object 410 may then display in 3-D with the word "pour" as a label that moves in sync with the glass. Or, for example, the added wording may be 3D text that displays and moves relative to the existing objects based on the second user's placement. The second user may accept the edits to objects 410 through acceptor 442, which may return to GUI 421 still showing the second users' edits. The second user may then pass the edited augmented reality back to the first user by selecting the place option in edit bar 422.

The first user may then receive or see the edited augmented reality in capture GUI 401, or, if viewing in real-time, may see a status that the second user has finished their edits and/or creation. The first user may make further modifications. The edited augmented reality may also then be passed back to the second user through user selector 412 by the first user, and the creating process may be iterated among any number of rounds of edits among any number of collaborating users. Once satisfied, the first user, or any other user with permission, may accept and place the created augmented reality through acceptor 462, with all edits and augmented reality information created among several users representing that information received in S301 of example methods. The remainder of example methods may then be performed, with other users able to view and/or recreated the shared collaboratively-created augmented reality in later portions of example methods, using all other information therein.

While the example of FIG. 4, with first user having capture GUI 401 and second user having edit GUI 421, shows a static process whereby the augmented reality is built in discreet stages with only one user making modifications at any time, it is understood that multiple users could make edits simultaneously, with all edits appearing for all users simultaneously in real time. Similarly, the flow back-and-forth between users and example embodiment GUIs 421 and 401 may be separated by great lengths of time; for instance, users may make edits over a series of days, while potentially switching apps or turning off their communications devices, before completion. In this instance the built augmented reality may be saved in the communications device or with a host for sharing the latest update of the augmented reality.

Although the example of FIG. 4 uses visual underlying media and augmented reality information, it is understood that several different types of non-visual information may be used instead or in addition, including those types discussed in the incorporated '157 application. In this way, a user of example methods may create any type of augmented reality perceivable to users with various sharing and/or performance conditions that are entirely compatible with the various example methods of selective performance in the incorporated '157 application.

Throughout the examples of FIGS. 1-4, augmented reality may be performed by joining augmented reality information with underlying perceivable media to create the perception that augmented elements are actually a part of the underlying media. While information transfer among various devices may include sending and receiving the entire augmented reality as a stand-alone piece of media for reproduction, to save bandwidth, storage, and other network resources, only augmented reality information including augmented object or element information and display properties may be sent and received. These more limited elements may then be separately reproduced in later-captured underlying media to re-create the augmented reality with substantial fidelity as when it was created by a separate user and/or at a separate instance. In combination with anchor and/or higher-precision location, and even device orientation, verification, the re-created/later performed augmented reality may present a very similar mixture of augmented elements in combination and context with underlying media if less than the entire augmented reality is transferred among devices.

As seen, example methods may thus be used to create commentary, description, art, access, tagging, instruction, etc. by several collaborating users and/or at different points in time. The underlying subject matter may be unique and/or only at a specific location, or may be mass-replicated at several different locations, with each having associated augmented reality. Creating users may limit augmented reality performance to specific users, locations, times of day, dates, group members, number of views, payment status, etc. in order to selectively share and control such content. Similarly, users may rate, reply to, report, share, tip, add view indicators, and/or comment on performed augmented reality to potentially guide creators toward better practices, avoid or remove harmful or illegal content, make others aware of particularly useful or interesting augmented realities, show support, etc.

Given the variety of example functions described herein, example embodiment devices may be structured in a variety of ways to provide desired functionality. Other divisions and/or omissions of structures and functionalities among any number of separate modules, processors, and/or servers are useable with example embodiment devices, including execution on a single machine or among distant, exclusive servers and processors. As discussed in the incorporated '157 application, actions throughout example methods may include user authentication, data verification, privacy controls, and/or content screening. For example, in example methods, users may never be provided with identifying information of the one another, such that a party creating augmented reality content and/or a party consuming the same may remain anonymous to the other. For example, data may be encrypted and not retained at one or all points in example methods, such that there may be no discoverable record of augmented reality, independent media, origin and/or limitation information in regard to such content, existence, performance, etc. Example methods may take advantage of a user login model requiring user authentication with a password over a secured connection and/or using operating-system-native security control and verification on communications devices, to ensure only verified, permitted human users access example methods and potentially user accounts.

Some example methods being described here, it is understood that one or more example methods may be used in combination and/or repetitively to produce multiple options and functionalities for users of communications devices. Example methods may be performed through proper computer programming or hardware configuring of networks and communications devices to receive augmented reality, origin, and limitation information and act in accordance with example methods, at any number of different processor-based devices that are communicatively connected. Similarly, example methods may be embodied on non-transitory computer-readable media that directly instruct computer processors to execute example methods and/or, through installation in memory operable in conjunction with a processor and user interface, configure general-purpose computers having the same into specific communications machines that execute example methods.

It will be appreciated by one skilled in the art that example embodiments may be varied through routine experimentation and without further inventive activity. For example, although a direct image analysis may be used to determine useable anchors in visual real-world media to be augmented, it is understood that distinct analysis and input may be used to determine augmented reality performance in auditory, video, or other perceivable media. Variations are not to be regarded as departure from the spirit and scope of the exemplary embodiments, and all such modifications as would be obvious to one skilled in the art are intended to be included within the scope of the following claims.

What is claimed is:

1. A communications device configured to create and transmit augmented reality for separate recreation, the device comprising:
    a display;
    a communications port;
    a computer processor configured to,
        receive media that is ambient to the device at a location and is not from user input of the device,
        receive augmented reality information for performance of augmented reality at the location,
        receive location information identifying where the augmented reality may be performed at the location, and
        transmit the augmented reality information and location information such that the augmented reality can be re-created by a receiver of the augmented reality information and the location information at the location.

2. The device of claim 1, wherein the computer processor is further configured to create the augmented reality information from user input and perform the augmented reality on the display with the media.

3. The device of claim 1, wherein the communications port is configured to receive at least one of Bluetooth, WiFi, and GPS signals, and wherein the computer processor is configured to receive the location information from the signals.

4. The device of claim 3, further comprising:
    at least one of a magnetometer and an accelerometer, wherein the computer processor is configured to receive the location information from the signals and the at least one of the magnetometer and the accelerometer.

5. The device of claim 1, wherein the computer processor is further configured to present, on the display, a build graphical user interface including the media and tools for adding the augmented reality information to the media, wherein the graphical user interface is configured to receive the user input through the display.

6. The device of claim 1, further comprising:
a camera, wherein, the media is a first visual scene captured by the camera and the augmented reality information is graphical and overlaid on the media at the location.

7. The device of claim 1, wherein the computer processor is further configured to receive the augmented reality information from a different user input of a different device.

8. A method of creating augmented reality in a computer processor-based system, the method comprising:
receiving, with the computer processor, media ambient to a first user at a location;
receiving, with the computer processor, augmented reality information from a second user for performance of augmented reality at the location, wherein the first user captures the media on a first communications device and the second user inputs the augmented reality information on a second communications device independently operated from the first communications device; and
transmitting, with the computer processor, the augmented reality information such that the augmented reality can be re-created by a receiver of the augmented reality information in similar media to the media ambient to the first user.

9. The method of claim 8, further comprising:
receiving, with the computer processor, an invitation from the first user to the second user to collaborate on the augmented reality.

10. The method of claim 8, further comprising:
transmitting, with the computer processor, the media to the second user for display on the second communications device.

11. The method of claim 8, wherein the computer processor is a component of the first communications device, and wherein the first communications device further includes a display and a communications port.

12. The method of claim 8, further comprising:
receiving, with the computer processor, additional augmented reality information from the first user for performance of augmented reality at the location using both the augmented reality information from the second user and the additional augmented reality information from the second user, wherein the transmitting transmits both the augmented reality information and the additional augmented reality information such that the augmented reality can be re-created by the receiver.

13. The method of claim 12, wherein the augmented reality information and the additional augmented reality information are shown in real time on both the first communications device and the second communications device.

14. The method of claim 8, further comprising:
receiving, with the computer processor, origin information limiting circumstances in which the augmented reality may be performed;
receiving, with the computer processor, limitation information of the receiver; and
comparing, with the computer processor, the limitation information with the origin information to determine if the receiver satisfies the circumstances, wherein the performing is executed only if the receiver satisfies the circumstances based on the comparing.

15. The method of claim 8, wherein the media is a visual scene captured by a camera, wherein the augmented reality information is a three-dimensional object, and wherein the augmented reality is the visual scene in combination with the three-dimensional object so that the three-dimensional object appears actually in the visual scene.

16. A method of handling contextual augmented reality in a computer processor-based system, the method comprising:
receiving, with the computer processor, augmented reality information and location information for the augmented reality information, wherein the augmented reality information and the location information are received from a first user communications device;
comparing, with the computer processor, the location information with a location of a second user communications device, wherein the location of the second user communications device is based on a geographic position and a device orientation; and
if the location information and the location of the second user communications device match based on the comparing, performing the augmented reality information in media received by the second communications device.

17. The method of claim 16, further comprising,
saving the augmented reality information in association with a creator of the augmented reality; and
transmitting the augmented reality information to a printer.

18. The method of claim 16, wherein the computer processor is in a mobile communications device having a camera capturing the second visual scene, and wherein the performing displays the augmented reality information in real time with the captured second visual scene on a screen of the mobile communications device.

19. The method of claim 17, further comprising:
receiving, with the computer processor, origin information limiting circumstances in which the augmented reality information may be performed;
receiving, with the computer processor, limitation information of a user communications device; and
comparing, with the computer processor, the limitation information with the origin information to determine if the user communications device satisfies the circumstances, wherein the performing is executed only if the user communications device satisfies the circumstances based on the comparing.

20. The method of claim 17, further comprising:
receiving, with the computer processor, additional augmented reality information from a third user communications device, wherein the performing includes performing the augmented reality information and the additional augmented reality information in media received by the second communications device.

* * * * *